United States Patent [19]

Takahashi et al.

[11] Patent Number: 4,938,096
[45] Date of Patent: Jul. 3, 1990

[54] AUTOMATIC TRANSMISSION FOR VEHICLE HAVING FORWARD CLUTCH AND COUNTER DRIVE GEAR POSITIONED BETWEEN TORQUE CONVERTER AND GEAR MECHANISM

[75] Inventors: Tokuyuki Takahashi, Aichi; Seitoku Kubo, Toyota; Masahumi Kinoshita, Toyota; Hiroshi Itoh, Toyota, all of Japan

[73] Assignee: Toyota Jidosha Kabushiki Kaisha, Japan

[21] Appl. No.: 322,935

[22] Filed: Mar. 14, 1989

[30] Foreign Application Priority Data

Mar. 18, 1988 [JP] Japan ................................. 63-65342

[51] Int. Cl.⁵ ...................... F16H 37/08; F16H 57/10
[52] U.S. Cl. ...................................... 475/72; 475/204;
475/206; 475/287
[58] Field of Search ................ 74/694, 695, 701, 733,
74/762

[56] References Cited

U.S. PATENT DOCUMENTS

| 4,258,586 | 3/1981 | Numazawa et al. ................ 74/695 |
| 4,261,227 | 4/1981 | Yamamori et al. ................ 74/695 |
| 4,263,823 | 4/1981 | Numazawa et al. ................ 74/695 |
| 4,315,443 | 2/1982 | Kubo et al. ........................ 74/695 |
| 4,549,447 | 10/1985 | Sakakibara ...................... 74/694 |
| 4,676,123 | 6/1987 | Kubo et al. ........................ 74/695 |
| 4,793,210 | 12/1988 | Bucksch ........................... 74/695 |

FOREIGN PATENT DOCUMENTS

| 3741746 | 6/1988 | Fed. Rep. of Germany . |
| 55-33948 | 3/1980 | Japan . |
| 57-87716 | 6/1982 | Japan . |
| 58-163849 | 9/1983 | Japan . |
| 2181798 | 4/1987 | United Kingdom . |

*Primary Examiner*—Dwight Diehl
*Assistant Examiner*—Benjamin Levi
*Attorney, Agent, or Firm*—Oliff & Berridge

[57] ABSTRACT

In an automatic transmission to provide a plurality of forward speed stages for a vehicle having a transversely mounted engine, a counter drive gear serving as a power output member of the speed change gear device to drive a counter shaft is positioned between a planetary gear mechanism of the speed change gear device and the torque converter, and the forward clutch which is engaged to provide a plurality of forward speed stages is positioned between the torque converter and the counter drive gear.

5 Claims, 2 Drawing Sheets

4,938,096

AUTOMATIC TRANSMISSION FOR VEHICLE HAVING FORWARD CLUTCH AND COUNTER DRIVE GEAR POSITIONED BETWEEN TORQUE CONVERTER AND GEAR MECHANISM

BACKGROUND OF THE INVENTION

1. Field of the Invention

The present invention relates to an automatic transmission for a vehicle such as automobile, and more particularly to an automatic transmission for a vehicle having a transversely mounted engine.

2. Description of the Prior Art

The modern automatic transmission for a vehicle is generally of a hydro-mechanical type which generally comprises a torque converter and a speed change gear device connected in series in said order to the crankshaft of an engine, with an oil hydraulic pump to generate oil hydraulic pressure for operating the transmission being generally mounted at the rear end of the torque converter as therefore located between the torque converter and the speed change gear device. Such a hydro-mechanical automatic transmission for a vehicle generally includes a plurality of hydraulically operated clutches and brakes which are selectively engaged or disengaged in order to switch over the route of power transmission in the speed change gear device so as selectively to provide one of a plurality of speed stages or a reverse stage. One of those clutches is generally the so-called forward clutch which is engaged to provide forward speed stages such as 1st, 2nd and 3rd speed stages and is kept in engagement throughout forward running of the vehicle while other clutches and brakes are switched over between engagement and disengagement according to the speed stages to be achieved.

From the view point of further improving the speed stage shifting performance of the transmission to be more smooth with no abrupt acceleration or deceleration, it is contemplated to position said forward clutch as close to the oil hydraulic pump and as remote from the other clutches and brakes as possible so that the oil hydraulic pressure supplied to the forward clutch is less affected to fluctuate by engagement or disengagement of, i.e. supply of hydraulic oil to or discharge thereof from, the other clutches and brakes.

On the hand, in a vehicle having a transversely mounted engine in which an axial combination of the engine and the automatic transmission is arranged transversely in the vehicle, it is required that a power output member of the transmission is located generally at a transversely central portion of the vehicle so that the power output member can directly drive a front differential or the like which is generally mounted at a transversely central portion of the vehicle. A structure of automatic transmission in which the power output member thereof is positioned at an axially central portion of the combination of the torque converter and the speed change gear device is described in, for example, Japanese Patent Laying-open Publications 55-33948 (1980) and 57-87716 (1982). In these prior art structures the power output gear wheel member is positioned between the torque converter and the speed change gear device to be coaxial thereto, and between the oil hydraulic pump mounted at the rear end of the torque converter and the speed change gear device. However, all clutches and brakes are positioned on the same axial side of the power output member as the gear mechanism of the speed change gear device as intimately assembled therewith according to the conventional common concept in this art that these components are assembled to be as axially compact as possible to reduce the longitudinal size of the transmission, particularly in the transverse type transmission.

In Japanese Patent Laying-open Publication 58-163849 (1983) a structure of automatic transmission is disclosed in which a clutch is positioned between the torque converter and a power output member of the speed change gear device of an axial combination thereof. In this transmission the clutch C2 positioned between the torque converter and the power output member G2 is a clutch which is engaged when and only when the transmission provides a certain speed stage, and is not kept in engagement while other clutches or brakes are switched over between engagement and disengagement.

SUMMARY OF THE INVENTION

The object of the present invention is to provide an automatic transmission for a vehicle such as an automobile having a transversely mounted engine in which the speed stage shifting performance is more improved so as to be more smooth with no abrupt acceleration or deceleration at speed stage shifting by maintaining the supply of oil hydraulic pressure to the forward clutch which is kept in engagement during switching over of engagement and disengagement of other clutches and/or brakes for shifting over forward speed stages at a stable condition substantially not affected by the switching over of supply or discharge of hydraulic oil to or from the other clutches and/or brakes.

The above-mentioned object is accomplished according to the present invention by an automatic transmission comprising: a torque converter, a speed change gear device including a planetary gear mechanism disposed coaxially with said torque converter and selective coupling means for changing over route of transmission of rotational power in said planetary gear mechanism so as selectively to provide a plurality of forward speed stages and a reverse stage, and a counter shaft disposed in parallel with said speed change gear device, said speed change gear device further comprising a counter drive gear serving as a power output member thereof, and said counter shaft having a counter driven gear meshing with said counter drive gear, characterized in that said counter drive gear is positioned between said torque converter and said speed change gear device, and a first clutch of said selective coupling means which is engaged to provide a plurality of forward speed stages is positioned between said torque converter and said counter drive gear.

According to the above-mentioned construction, since the first clutch is positioned close to the torque converter or the oil hydraulic pump provided at the rear end portion of the torque converter, this clutch can be supported by the casing of the hydraulic pump, and can be supplied with the hydraulic pressure directly through the pump casing, and therefore a short and direct hydraulic pressure supply passage construction for the first clutch allows the first clutch to be immune to on and off operations of the other clutches and brakes which are engaged and disengaged in switching over of the speed stages, and therefore substantial improvement can be obtained in reducing the shift shock. In addition, the hydraulic passage construction for the first clutch can be simplified by this arrangement. Further, if in this connection the other clutches and the brakes are positioned on the other axial side of the speed change gear device opposite to the first clutch, no special hydraulic seal means will be required for preventing fluctuations of the hydraulic pressure in the other clutches and brakes to affect the first clutch, and therefore the overall construction can be further simplified.

Further, since the counter drive gear is positioned between the torque converter and the speed change gear device, the counter shaft for transmitting the rotational output power from the axial position of the counter drive gear to the axial position of an input gear of a center differential can be shorter, and therefore the whole transmission device can be made more compact and light-weight.

Further, since a final drive gear provided on the counter shaft to drive the input gear of the center differential may generally have a smaller diameter than the counter driven gear meshing with the counter driven gear, the first clutch may be positioned to radially align with the final drive gear so that the space available around the peripheral portion of the final drive gear can be used for positioning the first clutch.

Therefore, according to a further feature of the present invention, all other clutches of said selective coupling means may be positioned on an axial side of said planetary gear mechanism opposite to an axial side thereof where said first clutch is positioned.

Further, said counter shaft may bear a final drive gear having a smaller diameter than said counter driven gear and positioned as substantially radially aligned with said first clutch.

Further, when the automatic transmission further comprises a pump for generating hydraulic pressure for operating said first clutch, said torque converter may comprise a casing which also provides a casing for said pump to defined a pump chamber therein and an annular extension at a portion thereof facing said first clutch, and said first clutch has a drum and a piston received in said drum to defined a piston chamber therein for actuating said first clutch, said drum being rotatably supported on said annular extension with said piston chamber being communicated with said pump chamber through a groove formed in said extension.

In a more specific embodiment of the present invention, said torque converter may include a pump impeller, a turbine runner and a stator, and said speed change gear device includes a first planetary gear mechanism having a first sun gear, a first ring gear, first planetary pinions and a first carrier supporting said first planetary pinions, a second planetary gear mechanism having a second sun gear, a second ring gear, second planetary pinions and a second carrier supporting said second planetary pinions, an intermediate shaft member, and a first, a second and a third hollow shaft member, said first ring gear being coupled with second carrier, said first carrier being coupled with said second ring gear and said counter drive gear, said turbine runner being coupled with said first sun gear via said first clutch and said first hollow shaft member, with said combination of said first ring gear and said second carrier via said intemediate shaft member passed through said first hollow shaft member and a second hollow shaft member which is passed through said third hollow shaft member, a second clutch of said selective coupling means and said second hollow shaft member, with said second sun gear via said intermediate shaft, a third clutch of said selective coupling means and said third hollow shaft member, and with said combination of said first ring gear and said second carrier via said intermediate shaft member, said third clutch, said third hollow shaft member, a fourth clutch of said selective coupling means and a first one-way clutch of said selective coupling means, one side of said fourth clutch connected with said first one-way clutch being adapted to be selectively braked via a first brake of said selective coupling means and also adapted to be braked in one rotational direction via a second one-way clutch of said selective coupling means, and said combination of said first ring gear and said second carrier being adapted to be selectively braked via a second brake of said selective coupling means.

BRIEF DESCRIPTION OF THE DRAWINGS

In the accompanying drawings.

DESCRIPTION OF THE PREFERRED EMBODIMENT

The present invention will now be described in more detail with respect of to a preferred embodiment with reference to the accompanying drawings.

Figure 1:
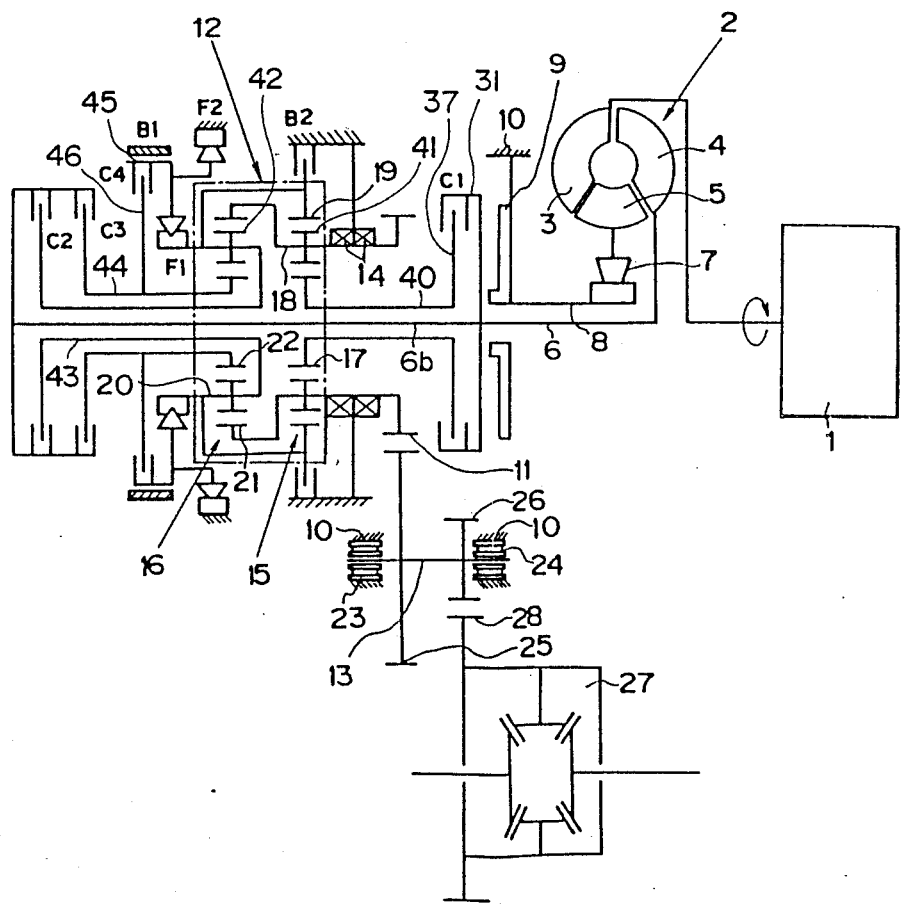
FIG. 1 is a skeleton figure showing the basic structure of an embodiment of the present invention.

Referring to FIG. 1 illustrating in a skeleton the principle of an embodiment of the present invention, the automatic transmission herein shown in adapted to be mounted in a vehicle with a transversely mounted engine, and has two planetary gear mechanisms to provide four forward speed stages and one reverse stage. The engine 1 is mounted transversely in a vehicle not shown, and its crankshaft is coupled with a pump impeller 3 of a torque converter 2 via a drive plate and front cover (not shown in the figure) of a well known type. The torque converter 2 further comprises a turbine runner 4 and a stator 5, and may further comprise a direct clutch (not shown in the figure). The turbine runner 4 is coupled with a transmission input shaft 6, while the stator 5 is engaged with a fixed shaft 8 via a one-way clutch 7.

Adjacent the torque converter 2 there is provided a hydraulic pump 9 as arranged along the same axis. This hydraulic pump 9 is fixed to a transmission casing 10, and its rotor is coupled via a hollow shaft member formed integrally with an outer shell of the pump impeller 3 (both not shown in the figure) so that the hydraulic pump 9 is substantially directly driven by the engine 1.

Next to the hydraulic pump 9, a first clutch (or forward clutch) C1 having a drum member 31 and a disk member 37 and a counter drive gear 11 are disposed in succession along the same axis. The forward clutch C1 is a conventional hydraulically engageable clutch, and its drum 31 is coupled with the input shaft 6 which is also coupled with an intermediate shaft 6b. Further, next to the counter drive gear a speed change gear device 12 including a first planetary gear mechanism 15 and a second planetary gear mechanism 16 is coaxially provided. The counter drive gear 11 is for transmitting drive power between the speed change gear device 12 and a counter shaft 13, and is rotatably supported from the transmission casing 10 via a bearing 14.

The first planetary gear mechanism 15 has the sun gear 17 coupled with the disk 37 of the forward clutch C1 via a hollow shaft 40 through which the intermediate shaft 6b extends, a carrier 18 coupled with the counter drive gear 11, a plurality of planetary pinions 41 rotatably supported by the carrier 18, and a ring gear 19 adapted to be selectively braked by a brake B2. The second planetary gear mechanism 16 has a sun gear 22, a carrier 20, a plurality of planetary pinions 42 rotatably supported by the carrier 20, and a ring gear 21. The carrier 18 of the first planetary gear mechanism 15 is coupled with the ring gear 21 of the second planetary gear mechanism, while the ring gear 19 of the first planetary gear mechanism 15 is coupled with the carrier 20 of the second planetary gear mechanism 16.

Next to the speed change gear device 12, a composite of second clutch C2, third clutch C3 and fourth clutch C4 is provided as disposed on an axial side of the speed change gear device 12 opposite to the axial side where the first clutch C1 is provided. The second clutch C2 selectively couples the intermediate shaft 6b with the carrier 20 of the second planetary gear mechanism 16 via a hollow shaft 43 through which the intermediate shaft 6b extends. The third clutch C3 selectively couples the intermediate shaft 6b with the sun gear 22 of the second planetary gear mechanism 16 via a hollow shaft 44 through which the hollow shaft 43 and the intermediate shaft 6b extend coaxially. The fourth clutch C4 has an outer rim member 45 adapted to be selectively braked by a first brake B1 and a disk member 46 coupled with the sun gear 22 of the second planetary gear mechanism 16 via the hollow shaft 44.

The rim portion 45 of the fourth clutch C4 is coupled with the carrier 20 of the second planetary gear mechanism 16 via a one-way clutch F1, and is also adapted to be braked against rotation in a reversed direction via a second one-way clutch F2. A second brake B2 is provided to selectively brake the integral combination of the ring gear 19 of the first planetary gear mechanism 15 and the carrier 20 of the second planetary gear mechanism 16.

The counter shaft 13 is provided in parallel with the input shaft 6 and the intermediate shaft 6b adjacent the outer periphery of the forward clutch C1, and is supported at opposite end portions thereof by bearings 23 and 24 from the transmission casing 10. The counter shaft 13 is, as in the conventional structures, to position the output member of the transmission more to the transversely central position in the vehicle, and bears a counter driven gear 25 meshing with the counter drive gear 11 and a final drive gear 26 which forms a power output gear of the transmission. The final drive gear 26 is a gear of smaller diameter than the counter driven gear 25, and is positioned approximately radially aligned with the forward clutch C1. Therefore, the counter shaft 13 is formed as a short shaft of a length which corresponds to the axial distance between the forward clutch C1 and the counter drive gear 11 plus the length of the opposite bearing portions received in the bearings 23 and 24. Since the final drive gear 26 is of smaller diameter than the counter driven gear 25, the forward clutch C1 radially extends beyond the outer peripheries of the counter drive and driven gears 11 and 25 to be close to the periphery of the final drive gear 26. Thus the overall radial dimension is reduced, and further the axial dimension is also greatly reduced by the forward clutch C1 being positioned by utilizing the space available around the periphery of the final drive gear 26. The final drive gear 26 meshes with a final driven gear 28 in a front differential 27.

The above described automatic transmission can selectively set up four forward speed stages and a reverse stage. The selective engagment of the clutches C1–C4, the brakes B1 and B2, and the one-way clutches F1 and F2 is shown in Table 1.

TABLE 1

|  | C1 | C2 | C3 | C4 | B1 | B2 | F1 | F2 |
|---|---|---|---|---|---|---|---|---|
| 1st | O |  |  |  |  | (O) | O | O |
| 2nd | O |  |  | O | (O) |  |  | O |
| 3rd | O | O |  | O |  |  | O |  |
| 4th |  | O |  | O | O |  |  |  |
| Reverse |  |  | O |  |  | O |  |  |

In Table 1, a circle indicates that the corresponding clutch, brake or one-way clutch is engaged, and a circle in parentheses indicates that the corresponding brake is engaged during engine braking.

Briefly describing the operation of the transmission described hereinabove, when the forward clutch C1 only is engaged, the sun gear 17 of the first planetary gear mechanism 15 rotates in the same direction as the engine 1 (this will be referred to as the positive direction hereinunder), and with the one-way clutches F1 and F2 being engaged, the ring gear 19 is braked, so that the carrier 18 and the counter drive gear 11 are rotated in the positive direction at a speed reduced relative to the input shaft 6. Thus the first foward speed stage is achieved.

From this state, if the fourth clutch C4 is engaged, the sun gear 22 of the second planetary gear mechanism 16 which was hitherto rotating in the reverse direction is fixed by the second one-way clutch F2 through the fourth clutch C4. Then, since the carrier 20 of the second planetary gear mechanism 16 and the ring gear 19 of the first planetary gear mechanism 15 rotate at a reduced speed in the positive direction, the counter drive gear 11 integral with the carrier 18 rotates in the positive direction somewhat more rapidly than in the first speed stage, and thus the second forward speed stage is achieved.

If further the second clutch C2 is engaged, since the carrier 20 of the second planetary gear mechanism 16 is integral with the ring gear 19 of the first planetary gear mechanism 15, in the first planetary gear mechanism 15 both the sun gear 17 and the ring gear 19 receive the input power, and therefore the first planetary gear mechanism 15 will rotate as a whole, producing no speed change effect. Thus the third speed stage or direct stage is achieved.

If further the forward clutch C1 is released and the first brake B1 is engaged, in the second planetary gear mechanism 16 the sun gear 22 is braked and the carrier 20 receives the input power, so that the ring gear 21 is rotated in the positive direction at a speed larger than that of the input shaft 6, and therefore the counter drive gear 11 coupled to the ring gear 21 through the carrier 18 of the first planetary gear mechanism 15 is rotated in the positive direction at an increased rate of rotation as compared with the input shaft 6. Thus the fourth (overdrive) stage is achieved.

On the other hand, when the third clutch C3 and the second brake B2 are engaged, in the second planetary gear mechanism 16, the carrier 20 is fixed, and therefore the input to the sun gear 22 is transmitted to the ring gear 21 in the reversed direction at a reduced rate as compared with the input shaft 6. Thus the reverse stage is achieved.

Figure 2:
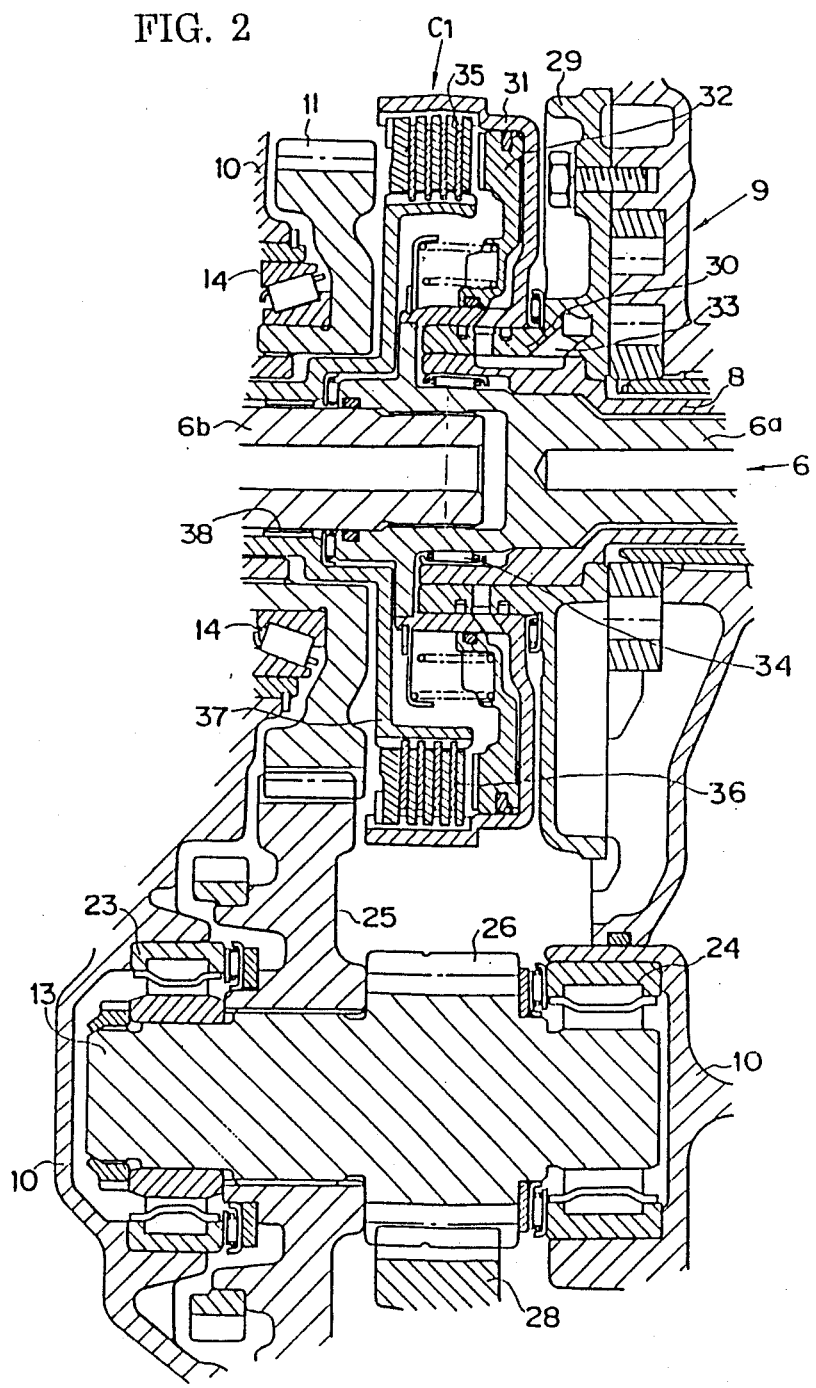
FIG. 2 is a longitudinally sectional view showing more concretely the arrangements of the forward clutch, the counter drive gear, the counter driven gear and the counter shaft.

The construction described above with respect to the disposition of the forward clutch C1, the counter drive gear 11 and the counter shaft 13 is shown in more specific detail in FIG. 2.

The casing of the hydraulic pump 9 has a boss portion 30 formed in a cover portion 29 thereof; on the outer periphery of this boss portion 30 is fitted the drum 31 of the forward clutch C1 so as to be rotatable therearound in fluid-tight manner, and a piston 32 is housed in the interior of the drum 31 so as to be movable in the axial direction. One end portion of the fixed shaft 8 supporting the stator 5 is press fit into the inner periphery of the boss 30, and a hydraulic passage 33 for supplying the hydraulic pressure for operating the piston 32 is formed to pass through the cover 29 and a groove formed in the outer surface portion of the fixed shaft 8.

The input shaft 6 is constructed in two parts, a first shaft 6a on the side of the torque converter 2, and a second shaft 6b on the side of the speed change gear device 12, and the joining end portion of the first shaft 6a is rotatably supported via a bearing 34 at the inside of the hollow fixed shaft 8 and is fixedly coupled with an inner peripheral portion of the drum 31. The second shaft 6b is fit into a bore formed at the joining end of the first shaft 6a with splines.

At the inside of an outer peripheral wall portion of the drum 31, a number of annular friction plates 35 are held by spline engagement, while mating annular friction plates 36 are provided as each being disposed alternatingly between each two adjacent friction plates 35 and supported by a clutch hub 37 through spline engagement. Thus the construction is such that when a hydraulic pressure is supplied through the hydraulic passage 33 to be applied to the piston 32, torque is transmitted between the clutch drum 31 and the clutch hub 37 through the friction plates 35 and 36. The clutch hub 37 is rotatably mounted on the second shaft 6b with a bearing 38 interposed therebetween, and is coupled to the sun gear 17 of the first planetary gear mechanism 15.

On the counter shaft 13 disposed in parallel with the input shaft 6, the counter driven gear 25 is mounted to radially align and mesh with the counter drive gear 11, while the final drive gear 26 having a smaller diameter than the final driven gear 25 is provided to be integral with the body of the counter shaft 13 as axially displaced from the counter driven gear 25 in order to position the rotational power output member for the transmission at a central position in the vehicle transverse direction. In order to provide a possibly maximum transmission torque capacity, the diameter of the forward clutch C1 is made larger than the diameter of the counter drive gear 11, utilizing the space available around the outside of the small diameter final drive gear 26.

Thus it will be understood that the automatic transmission according to the principle shown in FIG. 1 can be constructed in concrete terms as shown in FIG. 2. By the forward clutch C1 being independent of and remote from the other clutches, the forward clutch C1 is not affected by the hydraulic pressure supplied to the other clutches, and therefore it is not necessary to provide a special hydraulic seal to eliminate hydraulic influence such as fluctuations of the hydraulic pressure due to the switching over between on and off of the other clutches. Further, since the hydraulic pressure can be supplied to the forward clutch C1 through the casing of the hydraulic pump 9 which is a fixed member, the supply of hydraulic pressure is not susceptible to centrifugal force, and therefore the hydraulic pressure is stabilized and the speed change shock is reduced.

Although the present invention has been described in detail with respect to a particular embodiment thereof, it is to be noted that various modifications will be possible with respect to the shown embodiment without departing from the spirit of the invention.

We claim:

1. An automatic transmission comprising: a torque converter; a speed change gear device including a planetary gear mechanism disposed coaxially with said torque converter, selective coupling means for changing over route of transmission of rotational power in said planetary gear mechanism so as selectively to provide a plurality of forward speed stages and a reverse stage, and a counter drive gear serving as a power output member thereof; a pump disposed coaxially between said torque converter and said speed change gear device and adapted to generate hydraulic pressure for operating said selective coupling means; and a counter shaft disposed in parallel with said speed change gear device and having a counter driven gear meshing with said counter drive gear; said selective coupling means including a first clutch adapted to be engaged to provide a lowest and a next to the lowest speed stage, said first clutch being coaxially disposed between said pump and said counter drive gear with the remainder of said selective coupling means and said planetary gear mechanism of said speed change gear device being disposed axially on a side of said counter drive gear opposite to a side thereof facing said first clutch.

2. An automatic transmission according to claim 1, wherein said selective coupling means except said first clutch are positioned on an axial side of said planetary gear mechanism opposite to an axial side thereof where said first clutch is positioned.

3. An automatic transmission according to claim 1, wherein said counter shaft bears a final drive gear having a smaller diameter than said counter driven gear and positioned as substantially radially aligned with said first clutch.

4. An automatic transmission according to claim 1, wherein said pump generates hydraulic pressure for operating said first clutch, wherein said torque converter comprises a casing which also provides a casing for said pump to define a pump chamber therein and an annular extension at a portion thereof facing said first clutch, and said first clutch has a drum and a piston received in said drum to defined a piston chamber therein for actuating said first clutch, said drum being rotatably supported on said annualr extension with said piston chamber being communicated with said pump chamber through a groove formed in said extension.

5. An automatic transmission according to claim 1, wherein said torque converter includes a pump impeller, a turbine runner and a stator, and said speed change gear device includes a first planetary gear mechanism having a first sun gearm, a first ring gear, first planetary pinions and a first carrier supporting said first planetary pinions, a second planetary gear mechanism having a second sun gear, a second ring gear, second planetary pinions and a second carrier supporting said second planetary pinions, an intermediate shaft member, and a first, a second and a third hollow shaft member, said first ring gear being coupled with second carrier, said first carrier being coupled with said second ring gear and said counter drive gear, said turbine runner being coupled with said first sun gear via said first clutch and said first hollow shaft member, with said combination of said first ring gear and said second carrier via said intermediate shaft member passed through said first hollow shaft member and a second hollow shaft member which is passed through said third hollow shaft member, a second clutch of said selective coupling means and said second hollow shaft member, with said second sun gear via said intermediate shaft, a third clutch of said selective coupling means and said third hollow shaft member, and with said combination of said first ring gear and said second carrier via said intermediate shaft member, said third clutch, said third hollow shaft member, a fourth clutch of said selective coupling means and a first one-way clutch of said selective coupling means, one side of said fourth clutch connected with said first one-way clutch being adapted to be selectively braked via a first brake of said selective coupling means and also adapted to be braked in one rotational direction via a second one-way clutch of said selective coupling means, and said combination of said first ring gear and said second carrier being adapted to be selectively braked via a second brake of said selective coupling means.

* * * * *